(12) United States Patent
Ottosson

(10) Patent No.: US 8,316,804 B2
(45) Date of Patent: Nov. 27, 2012

(54) PET GAME BOARD DETAIL AND BOARD GAME

(76) Inventor: Nina Ottosson, Karlskoga (SE)

( * ) Notice: Subject to any disclaimer, the term of this patent is extended or adjusted under 35 U.S.C. 154(b) by 0 days.

(21) Appl. No.: 12/746,058

(22) PCT Filed: Dec. 8, 2008

(86) PCT No.: PCT/SE2008/051415
§ 371 (c)(1),
(2), (4) Date: Jun. 9, 2010

(87) PCT Pub. No.: WO2009/078788
PCT Pub. Date: Jun. 25, 2009

(65) Prior Publication Data
US 2010/0275855 A1 Nov. 4, 2010

(30) Foreign Application Priority Data
Dec. 14, 2007 (SE) ...................... 0702795

(51) Int. Cl.
*A01K 29/00* (2006.01)
(52) U.S. Cl. ...................................... 119/707
(58) Field of Classification Search ............... 119/702, 119/707, 710, 417, 419; 273/281, 282.1, 273/282.3, 287, 290; 446/69, 73, 124, 127, 446/489
See application file for complete search history.

(56) References Cited

U.S. PATENT DOCUMENTS

| | | | | | |
|---|---|---|---|---|---|
| 2,886,861 | A | * | 5/1959 | Bartlett | 49/402 |
| 3,462,154 | A | * | 8/1969 | Giraud et al. | 273/287 |
| 3,776,552 | A | * | 12/1973 | Lemelson | 273/266 |
| 4,089,529 | A | * | 5/1978 | Usami | 273/282.1 |
| 4,327,668 | A | * | 5/1982 | Phillips | 119/707 |
| 4,513,014 | A | * | 4/1985 | Edwards | 426/132 |
| 5,415,132 | A | * | 5/1995 | Meyer | 119/707 |
| 5,553,570 | A | * | 9/1996 | VanNatter et al. | 119/709 |
| 6,073,581 | A | | 6/2000 | Wang | |
| D454,236 | S | * | 3/2002 | Kaplan | D30/160 |

(Continued)

FOREIGN PATENT DOCUMENTS
DE 202005018332 U1 2/2006
(Continued)

OTHER PUBLICATIONS

International Search Report and Written Opinion issued in parent PCT application on Nov. 2, 2009.
(Continued)

*Primary Examiner* — Rob Swiatek
*Assistant Examiner* — Ebony Evans
(74) *Attorney, Agent, or Firm* — Jeffrey S. Melcher; Manelli Selter PLLC

(57) ABSTRACT

This invention relates to a pet game cover, comprising a body (8) having a height (h), a width (w) and a length (L) arranged to be gripable by the mouth of a pet, said body (8) or body portion (76') having outer walls comprising outer wall portions, a lower end and a top end, said body (8) or body portion (76') being arranged with an inwardly protruding void (v) to form an open space within said body (8) or body portion (76'), wherein said void (v) is formed by having a main portion of the total area exposed by said outer walls provided by wall portions having a limited wall thickness (t), and formed in a durable and washable polymeric material, preferably thermo formable.

7 Claims, 9 Drawing Sheets

U.S. PATENT DOCUMENTS

| | | | |
|---|---|---|---|
| 6,405,681 B1 * | 6/2002 | Ward | 119/707 |
| 6,840,197 B1 * | 1/2005 | Trompke | 119/711 |
| 2005/0284409 A1 * | 12/2005 | Ritchey et al. | 119/707 |
| 2007/0283899 A1 * | 12/2007 | Genitrini | 119/708 |

FOREIGN PATENT DOCUMENTS

| | | |
|---|---|---|
| DE | 202008011741 U1 | 2/2009 |
| GB | 2448772 A | 10/2006 |
| SE | 520848 C2 | 9/2003 |
| SE | 524376 C2 | 8/2004 |
| SE | 0302480 L | 3/2005 |

OTHER PUBLICATIONS

Deutchland Examination Report in corresponding German application (stamped Jul. 23, 2011).

* cited by examiner

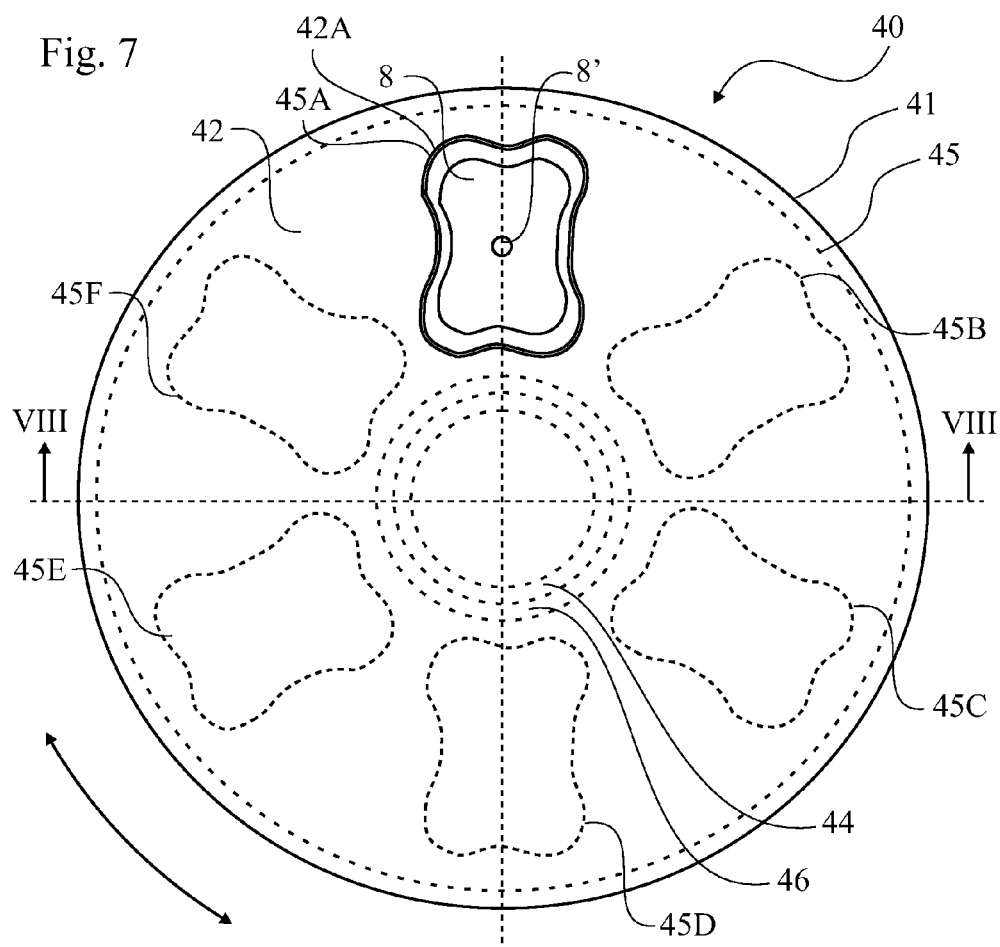
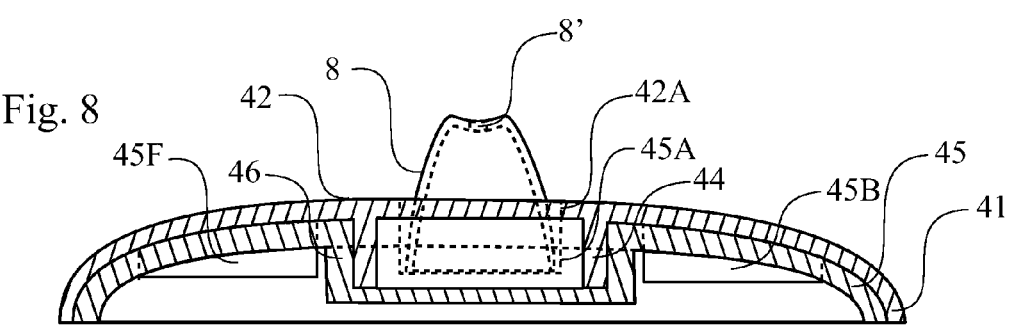

PET GAME BOARD DETAIL AND BOARD GAME

CROSS-REFERENCE TO RELATED APPLICATIONS

This application is a national stage entry under 35 U.S.C. 371 of International Application No. PCT/SE2008/051415, filed 8 Dec. 2008 designating the United States. This application claims foreign priority under 35 U.S.C. 119 and 365 to Swedish Patent Application No. 0702795-6, filed 14 Dec. 2007.

TECHNICAL FIELD

The present invention relates generally to stimulating, encouraging and motivating games and methods of playing regarding pets, e.g. dogs and cats. More particularly, the invention relates to motivational games, toys and methods for assessing the pet training skills in the form of board games and a pet board game detail adapted to be used with such board games.

PRIOR ART

Attempts have been made to combine toys and functions where the pet has to perform an action to reach the goal, and where the goal is to get out a snack out of the toy by performing some action. By way of example, reference can be made to U.S. Pat. No. 6,073,581. In this category also board games for pets have been developed. However known such board games have shown to present some disadvantages.

Firstly, known board games for pets are often made of materials which make them rather expensive to produce. Further due to a tough and unkind use, the design and choice of material make details of such board games prone to quickly degenerate both in shape and in function, e.g. materials such as wood or rope or fabric/textile which do not in the long run resist bites, scratches due to sharp teeth or claws of the pet. Moreover details of such board games often get negatively affected by saliva of the pet and are not always easy to clean and/to refresh.

BRIEF DESCRIPTION OF THE INVENTION

The object of the present invention is to produce and eliminate or at least minimize the abovementioned drawbacks, which according to one aspect of the invention is achieved by means of a pet board game detail according to the claims.

Thanks to the design according to the invention there is presented a pet game cover, that may be produced cost efficiently (rel. low cost for material and efficient production methods), that may be made in an easy to clean material and shape, that may be designed in a rather complex shape (e.g. a pet related shape, such as a bone), that may be given a standardized shape which allows for larger production series, leading to larger availability and increased ease of replacement, that may allow use and exchange of the said pet board game detail between different board game units and in a special embodiment that may be utilized as a standalone toy, i.e. without a game unit.

Further advantages and aspects of the invention will be evident from the detailed description below. Further the detailed description includes other new aspects, e.g. new board games, combinations of details and board games and new details that may be made the subject for separate divisional applications.

DESCRIPTION OF THE FIGURES

The invention will be described in greater detail below with reference to the appended figures, in which:

FIG. 7 shows a fourth plastic game unit 40, according to the invention in a view from above, FIG. 8 shows a fourth plastic game unit 40, in a cross-sectional view from the front.

DETAILED DESCRIPTION

Figure 1:
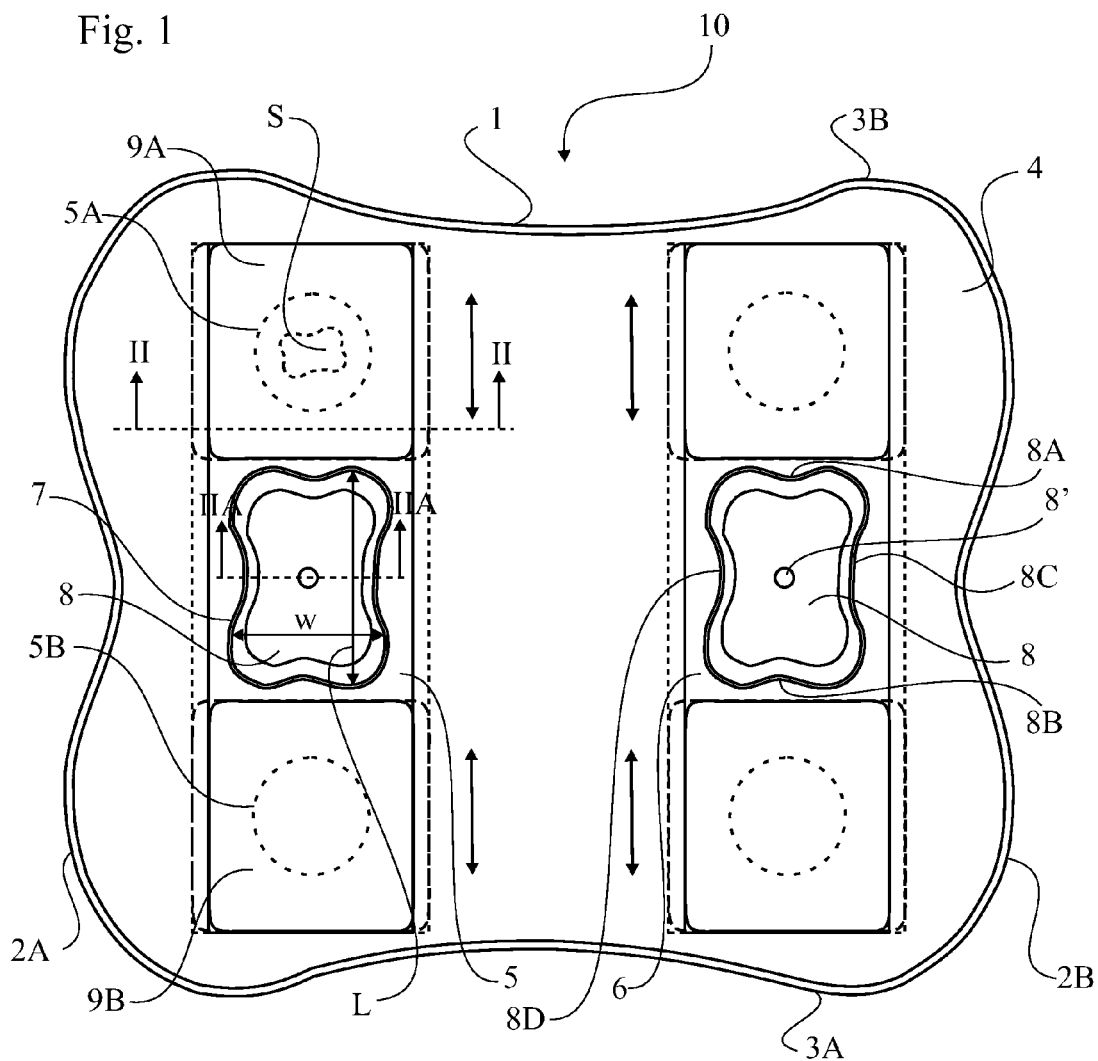
FIG. 1 shows a first plastic game unit 10, according to the invention in a view from above.

FIG. 1 shows a first plastic game unit 10, in a view from above. The first game unit 10 consists of a plastic board 1, having in this example a rectangular bone-formed design with two shorter sides 2A and 2B and two longer sides 3A and 3B. On the upper side 4 of the board 1 there are cavities i.e. tracks, and in this example there are two identically and parallel straight tracks 5 and 6. The straight tracks 5 and 6, on the upper side 4 of the board 1, are both in parallel with the shorter sides 2A and 2B of the board 1 and where the track 5 is closest to the side 2A and the track 6 is closest to the side 2B. Positioned in each end of the track 5 there is a cylindrical cavity 5A and 5B, and in the middle of the track there is another cavity 7 positioned. The cavity 7 has a bone designed shape. In the cavity 7 is a pet board game detail, in the form of a pet game cover 8 placed with a corresponding and fitting shape. The pet game cover 8 according to the invention, having in this example a rectangular bone-formed shape with a length L and a width w with two short end sidewalls 8A and 8B and two long end sidewalls 8C and 8D, can be placed and removed from its position in the said cavity 7 by a vertical movement or by a pivoting movement sideways. At the ends of the track 5 there are placed identically plastic game covers 9A and 9B, which are hiding the cavities 5A and 5B. The game covers 9A and 9B can move along the track 5, i.e.

perpendicularly in relation to the general longer sides 3A and 3B. A pet snack S placed in the cavity 5A under the game cover 9A. When the pet game cover 8 is positioned in the cavity 7, the ability to move the game covers 9A and 9B is blocked.

Figure 2:
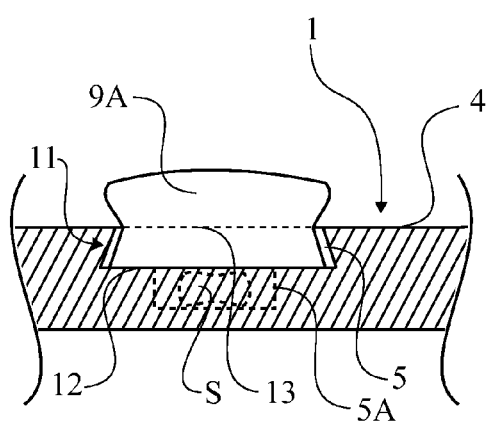
FIG. 2 shows the first plastic game unit 10, according to the invention in a cross-sectional view from the front.

FIG. 2 shows the first plastic game unit 10 in a cross-sectional view along II-II in FIG. 1. The track 5, positioned in parallel with and closest to the short side 2A, has a track profile 11 where the bottom 12 of the track is wider than the top or opening 13, i.e. it has a pyramidal or conical profile. The foot of or the lower part of the cover 9A has a, to the track profile, corresponding pyramidal or conical shape, which allows a movement along the track 5, i.e. the covers 9A and 9B can not be removed from the track 5. In the cavity 5A and under the game cover 9A is the pet snack S hidden.

Figure 2A:
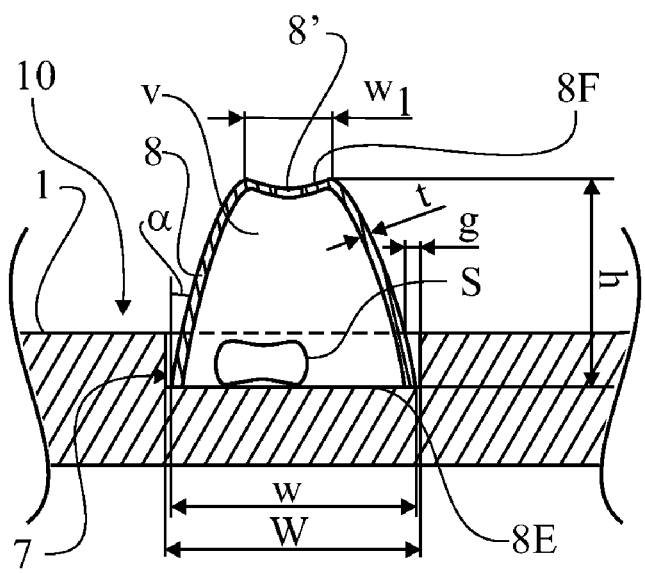
FIG. 2A shows the first plastic game unit 10, according to the invention in a cross-sectional view from the front.

FIG. 2A shows the first plastic game unit 10 in a cross-sectional view along IIA-IIA in FIG. 1, including the pet game cover 8 according to the invention. The pet game cover 8, having the width w at the lower end 8E, the width $w_1$ at the top end 8F and the length L, has a height h and a wall thickness t which all together defines a void v, within the cover 8. The width w at the lower end 8E is between 20-100 mm preferably between 30-70 mm, the width $w_1$ at the top end 8F is between 10-80 mm preferably between 10-50 mm, the length L is between 50-120 mm preferably 40-90 mm, the height h is between 30-100 mm preferably between 40-70 mm, and the thickness t is between 0.5-5 mm preferably between 1-3 mm. Thanks to this design frames there is presented a void/space v that is well adapted to hide objects S for pets and that contrary to conventional covers presents a relatively large space/void v in relation to the outer configuration. (Known covers often make use of very thick walls of the cover and may often merely present a trivial shape (e.g. cylindrical) of the void/space).

Figure 2B:
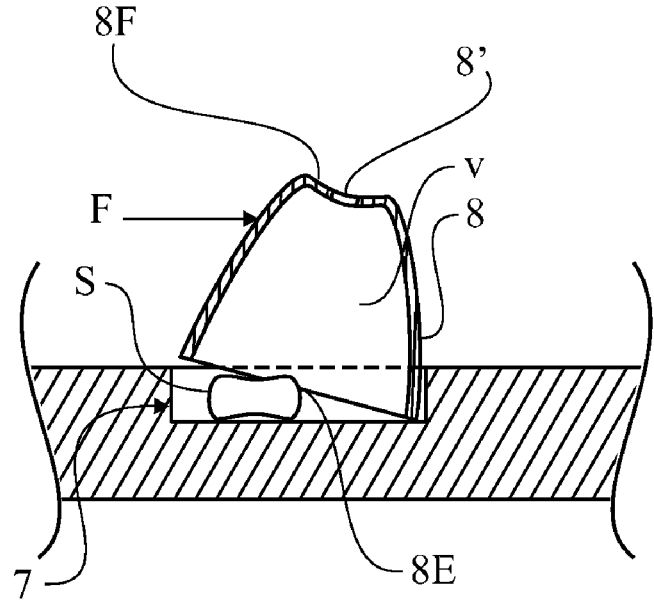
FIG. 2B shows the first plastic game unit 10, according to the invention in a cross-sectional view.

The lower width w, the top width $w_1$ and the height h is chosen such that it allows for a shape wherein the outer walls of the cover 8, are tapered/generally cone shaped (i.e. presenting an angel a between the long end sidewall 8D of the pet game cover 8 and a vertical line perpendicular to the bottom of the cavity 7). The dimensions of the cavity 7 corresponds to the dimension of the lower end of the cover 8, e.g. with a width W that is slightly larger than the width w of the cover, as seen in the cross section shown in FIG. 2A. The walls of the cavity 7 extend generally vertically. Thanks to the shape of the cover 8 there will be provided at the foot end side of the pet game cover 8, a gap g between the outer wall thereof and the wall of the cavity that makes it possible to tilt the cover, as shown in FIG. 2B. Hence the design allows for both vertical and pivoting movement of the pet game cover 8 to remove cover 8 from its position in the cavity 7, contrary to most board games that merely allows for vertical movement. Further the design allows for easy relief (clearance) during manufacture, that facilitates use of cost efficient manufacturing methods, e.g. thermo plastic form moulding.

FIG. 2B shows the first plastic game unit 10 in a cross-sectional view according to FIG. 2A, including the pet game cover 8 according to the invention. The pet game cover 8, can be moved and lifted vertical out of the cavity 7, or it can be pushed or pulled out of the cavity 7 by a pivoting movement through a horizontal force F applied on either of the side walls 8A-8D of the pet game cover 8.

The void v, of the pet game cover 8, makes it possible to hide an object S, e.g. a snack for a dog or another object fitting into the space inside the pet game cover 8. At the top of the pet game cover 8 there is a hole 8', which allows fitting of a rope or a string (not shown). Accordingly there is preferably arranged a further possibility of removing the cover 8, by having a rope (or the like) that can be gripped to lift the cover (which may increase the range of use of a game, e.g. to a parrot). The shape of the plastic cover is preferably standardized, which means it can be used in several game units. The pet game cover 8 can also by used in a stand alone purpose where objects can be hidden e.g. directly on a floor. As the pet game cover 8 preferably is produced in a plastic material, the shape of the cover can be, easy and cost efficient, changed and modified into any form.

The method of, and how the function of the said first plastic game unit 10 is utilized when prepared for e.g. a training of a dog, will be explained in the following. The preparation is performed by putting an object e.g. some dog snack, in one of or in both of the cavities 5A and 5B. The cavities 5A and 5B are covered by the covers 9A and 9B when positioned at the ends of the track 5. The pet game cover 8 is put into the cavity 7 whereby the covers 9A and 9B are blocked and the preparation of the track 5 is completed. The preparation of the track 6 is done in the same manner. The dog will now start to sniff at and try to find out where the snack is located and further how to get it out of the first game unit 10. To succeed the dog first has to find out how to remove the blocking pet game cover 8 which prevents from moving the covers 9A and 9B, it can either use its jaw or its paws to pull out the said blocking pet game cover 8. The second step is to find out and to understand how to move the covers 9A and 9B, the dog will probably use the nose to push the covers 9A and 9B away from their positions, but of course is it possible for it to use the paws as well as the jaw. When the dog has managed to move the covers 9A and 9B along the track 5 the snacks will be visible and can finally be eaten.

Figure 3:
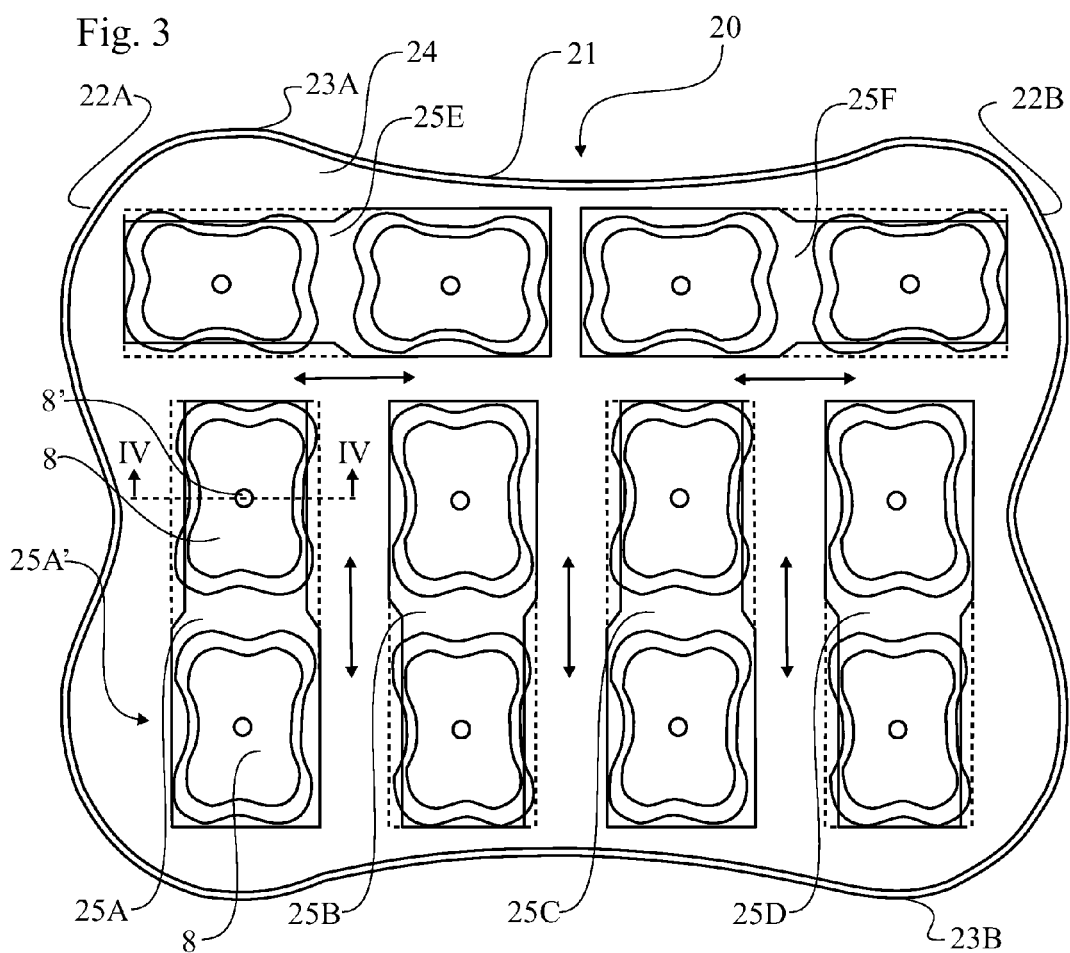
FIG. 3 shows a second plastic game unit 20, according to the invention in a view from above.

FIG. 3 shows a second plastic game unit 20, in a view from above. The second game unit 20 consists of a plastic board 21, having in this example a rectangular bone-formed design with two shorter sides 22A and 22B and two general longer sides 23A and 23B. On the upper side 24 of the board 21 there are cavities i.e. tracks, and in this example there are six identically straight tracks 25A-F, which of 25A-D are in parallel with the short sides 22A and 22B. The tracks 25E-F are perpendicularly in relation to the tracks 25A-D, i.e. they are in parallel with and close to the long side 23A and along a common horizontal line.

The track 25A, positioned in parallel with and closest to the general shorter side 22A and perpendicularly in relation to the general longer side 23B, has at its end, which is closest to the general longer side 23B, a wider section 25A'. The wider section 25A' has the same width from the top to the bottom of the track which makes it possible to put a plastic cover into the track 25A. At the opposite side of the wider section 25A' of the track 25, is placed a pet game cover 8. The pet game cover 8 is assembled through, first it is positioned in the wider section 25A' of the track 25 and second pushed into its end position in the opposite side of the wider section 25A'. A second pet game cover 8, is thereafter placed in the said wider section 25A'. The main purpose of the second pet game cover 8 is to block and to prevent the first pet game cover 8 from being pushed or pulled back along the track 25 to the wider section 25A'. The tracks 25E and 25F which are in parallel with the general longer side 23A have their wider section pointing into the centre of the board 24 i.e. the track 25E is mirrored to 25F over a vertical centre line.

Figure 4:
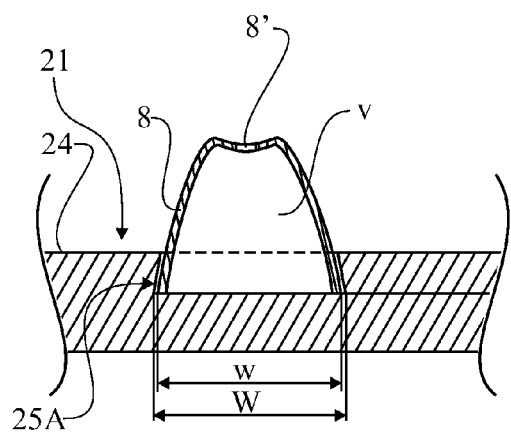
FIG. 4 shows a second plastic game unit 20, in a cross-sectional view from the front.

FIG. 4 shows the first plastic game unit 10 in a cross-sectional view along IV-IV in FIG. 3, including the pet game cover 8 according to the invention and according to FIG. 2A and 2B. The track 25A, as well as the pet game covers 8, have a pyramidal or conical profile i.e. the bottom of the track 25A is wider than the top. The space between the general longer sides 8C and 8D of the pet game cover 8 and the sides of the track 25A is defined by W-w, which is generally as described above, but a difference in relation to FIGS. 2A and 2B, the walls of the track 25A is also tapered in a corresponding manner as the pet game cover 8, whereby the cover is "locked" against vertical and/or pivoting movement, to merely allow movement by sliding within the track 25A.

The method of, and how the function of the second plastic game unit 20 is utilized when prepared for e.g. a training of a dog, will be explained in the following. Put an object e.g. some dog snack into the wider section of the track 25A', hide the snack by putting the pet game cover 8 into the wider section 25A' and over the snack. Push the pet game cover 8, and the snack, from the wider section 25A' along the track 25A into its end position. Block the pet game cover 8 by placing another pet game cover 8 into the wider section 25A' of the track 25 whereby the preparation of the track 25A is completed. The preparation of the tracks 25B-F is done in the same manner. The dog will now start to sniff at and try to find out where the snack is located and further how to get it out of the second game unit 20. To succeed the dog first has to find out how to remove one of the blocking pet game covers which prevents the movement within the tracks, and the dog can either use its jaw or its paws and claws to pull out the blocking covers. The second step is to find out and to understand how to move the hiding pet game covers at the end of the tracks, the dog will probably use the nose to push the pet game covers away from their positions, but of course is it possible for the dog to use the paws and claws as well as the jaw. When the dog has managed to move the pet game covers along their respectively tracks, and managed to lift them out, the snacks will be visible and can finally be eaten.

Figure 5:
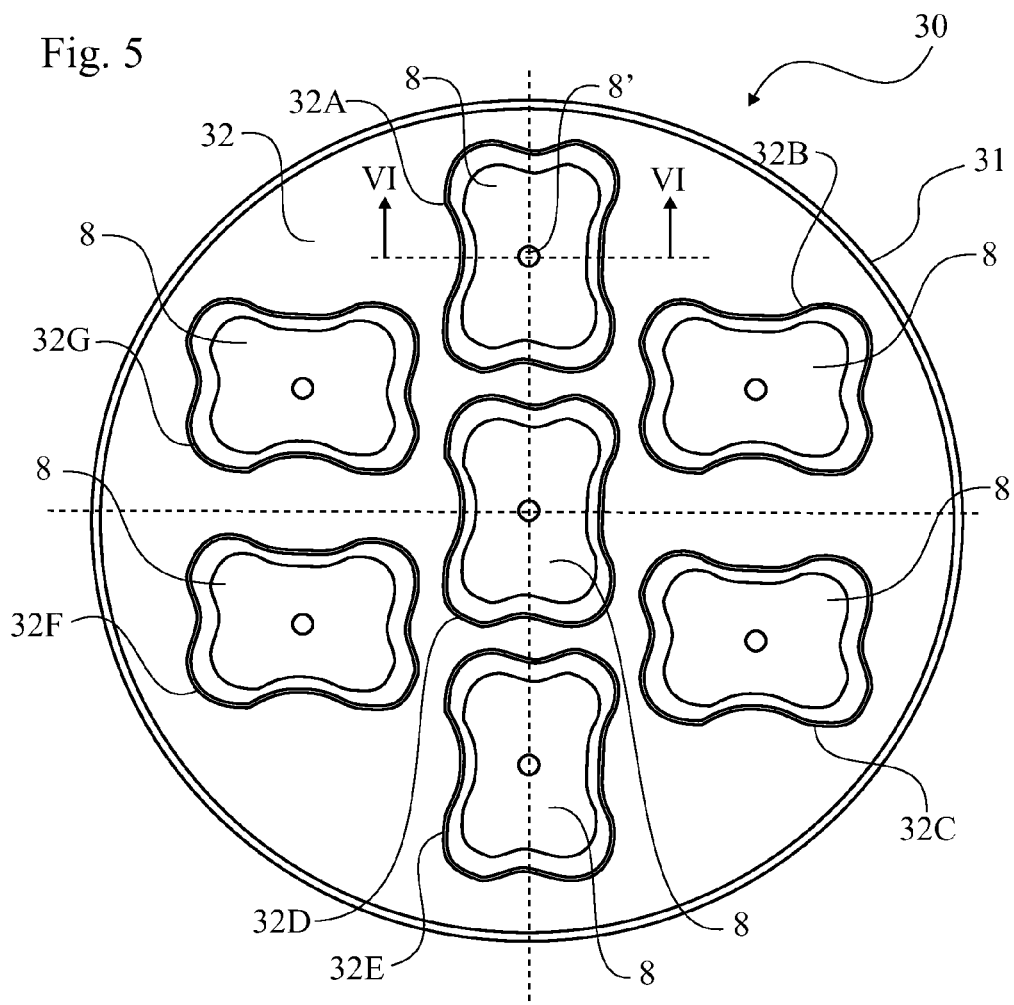
FIG. 5 shows a third plastic game unit 30, according to the invention in a view from above.

FIG. 5 shows a third plastic game unit 30, in a view from above. The third game unit 30 consists of a plastic board 31, having in this example a round shape and an upper side 32 with a light spherical surface. On the upper side 32 of the board 31 there are cavities, and in this example there are seven cavities 32A-G in a bone-shaped design, distributed over the board 31, and positioned in each of the cavities 32A-G is a pet game cover 8 according to the invention, described in FIG. 2A and 2B. A cavity 32A is positioned on top of a vertically oriented centre line, in the middle of the board 31 on the upper side 32. Under the cavity 32A, in the middle of the vertical centre line, is positioned the cavity 32D. At the bottom of the centre line is the cavity 32E positioned. On the right side of the vertical centre line and over a horizontal centre line, in the middle of the said board 31 is the cavity 32B positioned. Also on the right side of the vertical centre line and under the horizontal line, and to the cavity 32B mirrored over the horizontal centre line, is the cavity 32C positioned. On the left side of the vertical centre line and over the horizontal line, and to the cavity 32B mirrored over the vertical centre line, is the cavity 32G positioned. Also on the left side of the vertical centre line and under the horizontal line, and to the cavity 32G mirrored over the horizontal centre line, is the cavity 32F positioned.

Figure 6:
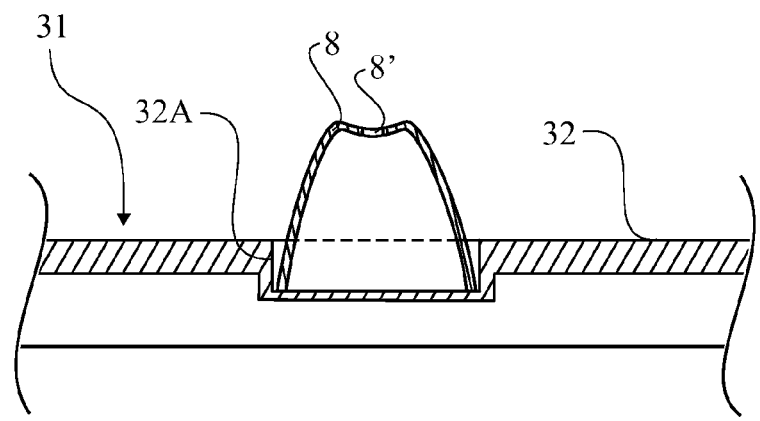
FIG. 6 shows a third plastic game unit 30, in a cross-sectional view from the front.

FIG. 6 shows the third plastic game unit 30 in a cross-sectional view along VI-VI in FIG. 5. The cavity 32A has a straight profile in means of that it has the same width from the bottom to the top. The pyramidal or conical form of the pet game cover 8 together with the straight profile of the cavity 32A makes it possible, through a pivoting movement, to tilt the pet game cover 8 out of the cavity 32A. On the top of the pet game cover 8 is a hole placed which makes it possible for assembling of e.g. a rope, and by use of the rope other pets beside of cats and dogs can lift the cover, and utilize the function of the game unit.

The method of, and how the function of the third plastic game unit 30 is utilized when prepared for e.g. a training of a dog, will be explained in the following. Put an object e.g. some dog snack randomly distributed among the cavities 32A-G and hide it by putting pet game covers 8 back into its cavities, and the preparation of the third game unit 30 is done. The dog will now start to sniff at and try to find out where the snack is located and further how to get it out. To succeed the dog has to find out how to remove the covers from their cavities, and it will probably use its jaw to bite and lift, or possibly its paws and claws to tilt the pet game covers out of their cavities.

FIG. 7 shows a fourth plastic game unit 40, in a view from above. The fourth game unit 40 consists of a plastic board 41, having in this example a round shape and a light spherical upper side 42. The fourth game unit 40 also consists of a round plastic board 45 with a flat bottom and a light spherical upper side corresponding to the shape of the inner side of the plastic board 41. On the upper side 42 and on a vertical centre line of the board 41 there is a throughout hole 42A, and on the inside and centre of the board 41 there is a cylindrical shaft 44. On the upper side of the board 45 there are cavities, and in this example there are six cavities 45A-F which are clockwise, equally distanced, distributed over the board 45. At the centre of the upper side of the board 45 there is a circular cavity 46 into which the cylindrical shaft 44 perfectly fits. The board 41 assembled on the board 45 can be moved around the centre of the shaft 44 mounted in the cavity 46, and by moving the board 41, the hole 42A can be positioned over each of the cavities 45A-F. In a position where the hole 42A of the board 41 is placed over the cavity 45A is a pet game cover 8, according to the invention and described in FIG. 2A and 2B, placed through the hole 42A and into the cavity 45A, whereby a content of the cavity 45A is hidden as well as the position is locked i.e. the board 41 can not be moved in relation to the board 45.

FIG. 8 shows the fourth plastic game unit 40 in a cross-sectional view along VIII-VIII in FIG. 7. The hole 42A and the cavity 45A has a straight profile in means of that it has the same width from the bottom of the cavity 45A to the top of the hole 42A. The cylindrical shaft 44 of the inside of the board 41 fits in the said circular cavity 46 of the board 45. The pet game cover 8, can be moved and lifted vertical out of the cavity 45A and the throughout hole 42A, or it can be pushed or pulled out of the cavity 45A and the throughout hole 42A by a pivoting movement through a horizontal force applied on either of the side walls 8A-8D of the pet game cover 8, as described in FIG. 2A and FIG. 2B.

The method of, and how the function of the fourth plastic game unit 40 is utilized when prepared for e.g. a training of a dog, will be explained in the following. Put an object e.g. some dog snack in each of the cavities 45A-F, by rotating and placing the hole 42A, of the board 41, over each cavity. At the last cavity, when all cavities are prepared, and when the pet game cover 8 is placed over the snack and into the last cavity the preparation is finished and the game unit 40 is locked. The dog will now start to sniff at and try to find out where the snack is located and further how to get it out. To succeed the dog has to find out how to remove the pet game cover 8 from the cavity. When the first snack is found and eaten the dog will try to reach the next one, and to be able to do that it will probably have to use its nose or possibly its paws and claws to make the hole 42A of the board 41 to rotate into position over the next cavity containing a snack.

Figure 9:
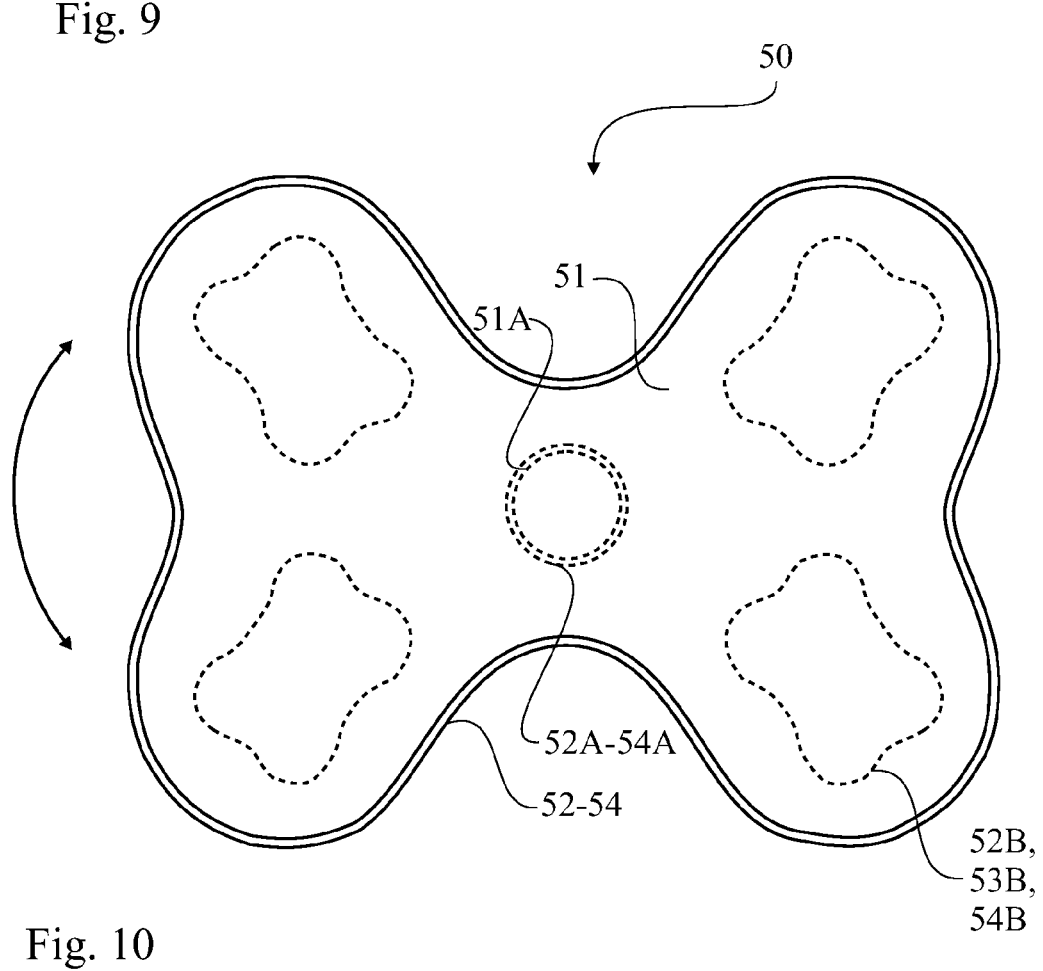
FIG. 9 shows a fifth plastic game unit 50, according to the invention in a view from above.

FIG. 9 shows a fifth plastic game unit 50, in a view from above. The fifth game unit 50 consists of, in this example four plastic boards 51-54 with rounded and bone-formed design, and where the upper side of the top board 51 is made in a light spherical design. Between the bottom board 54 and the top board 51 is the board 52 positioned closest to the top board 51 and the board 53 is positioned closest to the bottom board 54. The upper board 51 has at the centre a cylindrical shaft 51A, which goes through holes 52A-54A in the centre of the below positioned boards 52-54. The boards 51-54 can, independent of each other, be positioned in any angle around the cylindrical shaft 51A. On the upper side of, and in all four corners of each of the bone shaped boards 52-54 there are cavities or cavities, i.e. in this example there are four identically cavities referred to as 52B-54B. When the boards 51-54 are vertically aligned, i.e. positioned identically regarding their bone shapes, the board 51 will hide the cavities of the board 52, and the board 52 will hide the cavities of the board 53, and finally the board 53 will hide the cavities of the board 54.

Figure 10:
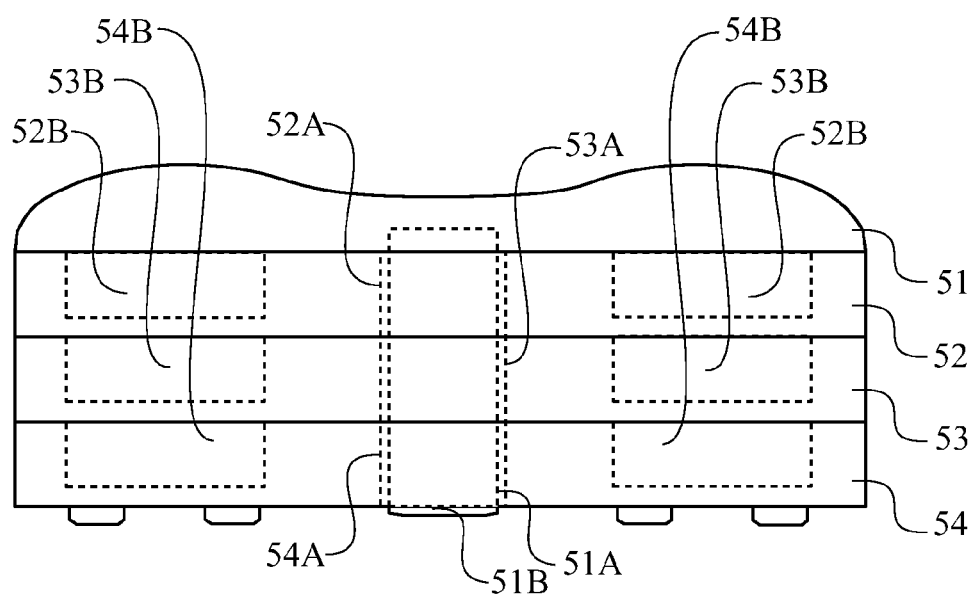
FIG. 10 shows a fifth plastic game unit 50, in a view from the front.

FIG. 10 shows the fifth plastic game unit 50 in a view from the front. The cylindrical shaft 51A is assembled and goes through the holes 52A-54A. The cavities 52B-54B has a straight profile in means of that it has the same width from the bottom of the cavity to the top. At the end of the cylindrical shaft 51A, under the board 54, is a strong locking nut 51B assembled, which keeps the boards 51-54 and the game unit 50 together.

The method of, and how the function of the fifth plastic game unit 50 is utilized when prepared for e.g. a training of a dog, will be explained in the following. Put an object e.g. some dog snack in each of the cavities 52B-54B, by rotating a board at the time which will make the cavities visible. When all wished cavities in the boards are filled with snacks, the boards shall be positioned vertically aligned regarding their bone shape and the preparation is finished. The dog will now start to sniff at and try to find out where the snack is located and further how to get it out. To succeed the dog has to find out how to move the top board 51, which hides the snacks in the cavities 52B, and as only two diagonal cavities are visible at a time the dog has to perform the task twice to empty a board. The dog will probably have to use its nose or possibly its paws and claws to make the boards move.

The fifth game unit 50 can also be used together with the pet game cover 8, according to the invention described in FIG. 2A and 2B, and then the boards have to be positioned such as two of the diagonal cavities are visible. The snacks can then be hidden by the pet game covers 8, and the pet game covers 8 will then also lock and prevent a rotational movement of the boards.

Figure 11:
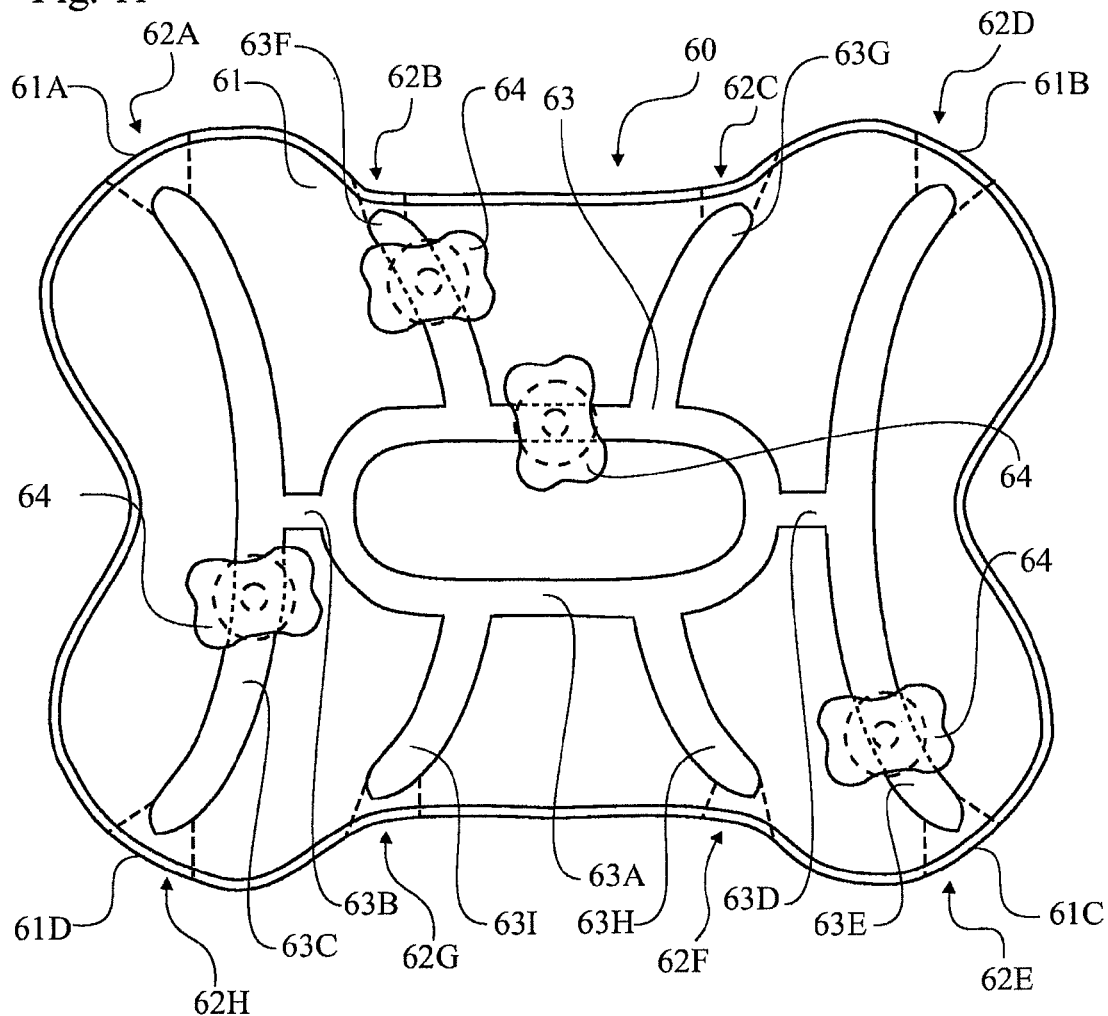
FIG. 11 shows a sixth plastic game unit 60, according to the invention in a view from above.

FIG. 11 shows a sixth plastic game unit 60, in a view from above. The sixth game unit 60 consists of, one upper plastic board 61 and one board 62 attached to and positioned under the board 61, and in this example both with rounded and bone-formed design. The upper board 61 has a track system 63 consisting of tracks 63A-I. The track system 63 has, in the middle of the board 61, an oval track 63A which has, on a horizontal centre line of the board 61, a connection via a connecting track 63B to a left track 63C. On the right side of the oval track 63A there is, also on the horizontal centre line and mirrored over a vertical centre line, a connection via a connecting track 63D to a right track 63E. The left track 63C, which in the middle is curved to the right, is going from the upper left corner 61A to the lower left corner 61D. The right track 63E, curved in the same way as the track 63C but mirrored over a vertical centre line, is going from the upper right corner 61B to the lower right corner 61C. On top of, and to the left of the vertically centre line, the track 63A is connected a track 63F, which is light curved to the left. Mirrored to the horizontal centre line, to the left of the vertically centre line and connected to the track 63A is a track 63I placed. To the right of the vertically centre line and mirrored to tracks 63F and 63I are the tracks 63G respectively 63H placed. A to the track system 63 identically track system 65, with a wider track, is placed in the board 62. One difference though in comparison with the track system 63 the track system of the board 62 have at the end of each corresponding track 63A-I a prolonged track which all have a opening in the sides of the board 62. In the track system 63 are placed, in this example identically and in a bone-formed design, four movable pet games handles 64. The pet games handles 64 can be moved along the tracks of the track system 63, i.e. they are fixed to the track system and can not be removed.

Figure 12:
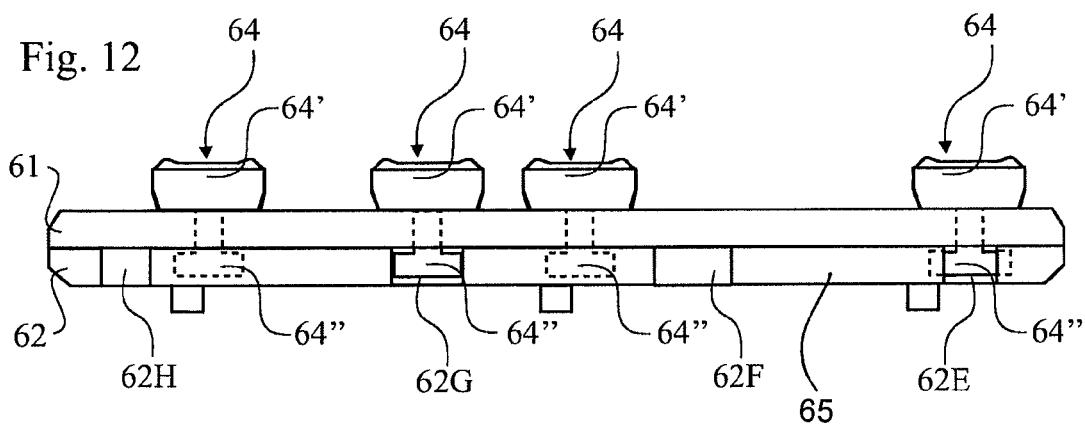
FIG. 12 shows a sixth plastic game unit 60, in a view from the front.

FIG. 12 shows the sixth plastic game unit 60 in a view from the front. The movable pet games handle 64 consisting of a head 64' and a foot 64". The foot 64" fit into the track system 65, and they are too wide to be able to go through the width of the track of the track system 63. By example when moving the pet games handle 64 in and along the track 63 to its end at the opening 62G an object, which fits in the track 65, can by use of the foot 64" be push out of the opening 62G.

The method of, and how the function of the said sixth plastic game unit 60 is utilized when prepared for e.g. a training of a dog, will be explained in the following. Put an object e.g. some dog snack in each of the track system 65, either via the openings 62A-H or via the tracks of the track system 63. Position the pet games handles 64 in suitable positions, and the preparation of the sixth game unit 60 is finished. The dog will now start to sniff at and try to find out where the snack is located and further how to get it out. To succeed the dog has to find out how to move the pet games handles 64 along the tracks of the tracks system 63 in order to push the snacks out of the openings 62A-H.

Figure 13:
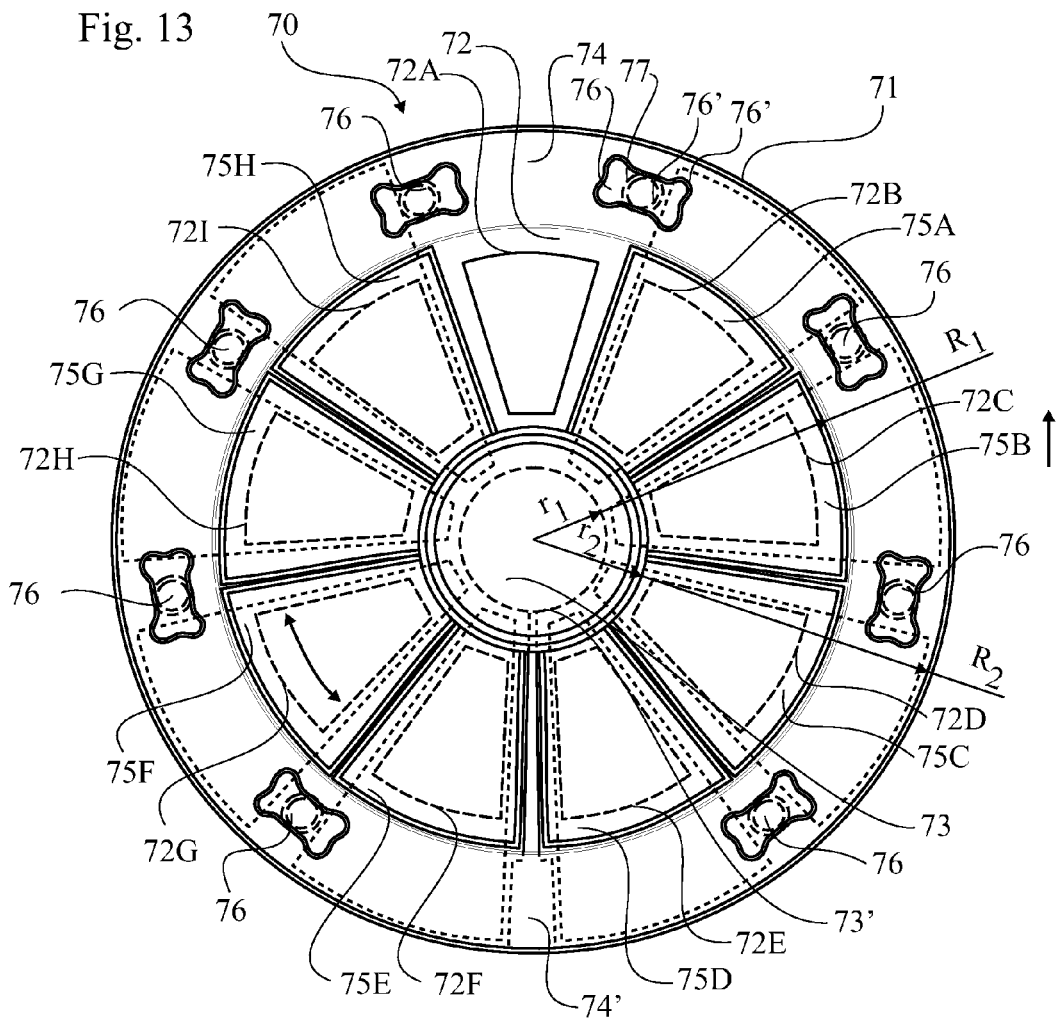
FIG. 13 shows a seventh plastic game unit 70, according to the invention in a view from above.

FIG. 13 shows a seventh plastic game unit 70, in a view from above. The seventh game unit 70 consists of one plastic board 71 which in this example has a round design with an outer radius $R_2$, and in the centre of the board 71 is a round limiter 73 with an upper radius $r_2$ and a beneath positioned round limiter 73' with its radius $r_1$. Outside of the limiter 73 is a lowered area 72 limited by the radius $r_2$ and $R_1$. The relation between the said radius are $r_1 < r_2 < R_1 < R_2$. On the outside of the lowered area 72 is an area 74 having the same height as the limiter 73. The lowered area 72 has nine cavities or cavities 72A-I clockwise oriented round the centre 73 and designed like pieces of a cake. Centralized at the position 12 o'clock is the cavity 72A, and at six o'clock there is another limiter 74' placed. On the right side of the cavity 72A and the limiter 74' are positioned clockwise from the top to the bottom the cavities 72B-E, and on the left side from the bottom to the top the cavities 72F-I.

Designed like pieces of a cake, and positioned over the area 72, with a height slightly higher than the limiter 73 and the area 74, i.e. fitting into the area between the radius $R_1$ and $r_2$ are eight covers 75A-H placed. The covers 75A-H have a top going between and through the opening limited by the centre 73 and the area 74. The bottom of the covers 75A-H, which is longer compared to the top, are reaching, on the centre side, into and close to the radius $r_1$, and on the outside out to and close to the radius $R_2$. I.e. the bottom of the covers 75A-H are stretching in and under the centre 73 and the out and under the area 74, which means they can move over and the along the circular area 72 but they can not be removed. The covers 75A-H are hiding eight of the nine cavities 72A-I, which means that only one of the cavity 72A-I can be exposed at a time. This also means that each of the covers 75A-H can only be moved and positioned over and cover one of its neighbour cavities, i.e. the cover 75A can hide the cavity 72A-B and the cover 75B can hide cavity 72B-C etc.

Figure 14:
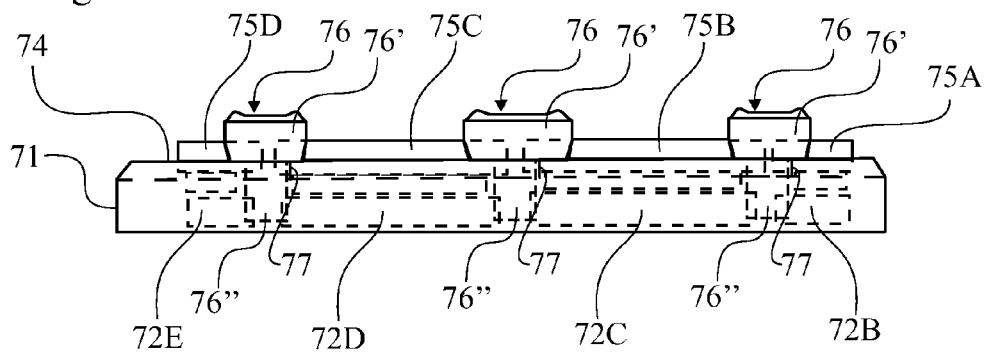
FIG. 14 shows a seventh plastic game unit 70, in a view from the right.

FIG. 14 shows the seventh plastic game unit 70 in a view from the right. The foot of the covers 75A-H are separated and locked by eight identically pet board game details, in the form of a plastic pet games lock 76. The pet games lock 76 has a top 76' with in this example a bone-formed design, and positioned under the top 76' of the pet games lock 76 is a cylindrical shaft or pin 76", that protrudes a substantial distance perpendicularly in relation to the length extension of the top 76'. The design thereof is preferably chosen such that it allows for easy relief (clearance) during manufacture, i.e. that facilitates use of cost efficient manufacturing methods, e.g. thermo plastic form moulding. The width and the length of the top 76' is preferably similar or the same as described in relation to FIG. 2A and 2B. The length of the shaft 76" is between 30-120 mm preferably 40-90 mm. The wall thickness, for the top 76' and the cylindrical pin 76" is between 0.5-5 mm preferably between 1-3 mm. The pins 76" go through corresponding circular holes 77 positioned and in the middle of the area 74 and between the foot of the covers 75A-H which is positioned under the area 74. The pet games lock 76 positioned to the right of the cavity 72A will prevent the cover 75A from being moved to the left, and the pet games lock 76 positioned to the left of the cavity 72A will prevent the cover 75H from being moved to the right.

The method of, and how the function of the seventh plastic game unit 70 is utilized when prepared for e.g. a training of a dog, will be explained in the following. Remove all the pet games locks 76 and move the covers one by one and put an object e.g. some dog snack in each of the cavities 72B-I. The cavity 72A can be kept empty as it will not be hidden. When all cavities 72B-I are filled with snacks, the covers 75A-H shall be moved and placed over the cavities and finally locked by the pet games locks 76. The preparation of the seventh game unit 70 is finished. The dog will now start to sniff at and try to find out where the snack is located and further how to get it out. To succeed the dog has to find out how to lift out the pet games locks 76 and after that how the covers 75A-H can be moved away from the cavities containing snacks. The dog will probably have to use its nose or possibly its paws and claws to solve the problem.

Some common preferred features for some, or most of, the above described game units, i.e. the first game unit 10—seventh game unit 70, are that preferably all are produced to have a design with smooth shapes, where as few sharp corners, ends or edges exists, in order to increase durability and to decrease risk of injuries. Further are all the game units and included articles preferably produced in a plastic material. There are many advantages by this choice, a frequent cleaning of the included parts and the plastic material may better resist the though treatment by the pets compared to traditional material such as fabric, wood and rope, and it is cheaper to manufacture the game units in the plastic material. The pet game covers 8 have a unified design, implying that one and the same pet game cover may be used for different game units, which positively influences scale advantages, i.e. large numbers provide low costs and it also facilitates easy retrieval of spare pet game covers. Further in a preferred embodiment the pet game covers are formed to be stackable, which also provides advantages, e.g. requiring less space during storage and transportation, thereby also providing an environmental advantage. The pet game covers may be produced with a hole on the top, which allows an assembly of a rope or a string, and a pet game cover having a rope can be lifted by e.g. a bird such as a parrot. The pet game cover can be utilized as a stand alone toy for pets. The design of the plastic cover, with a pyramidal or conical shape, makes it cost efficient to produce in regards of the production set up and in the production tool.

Figure 15:
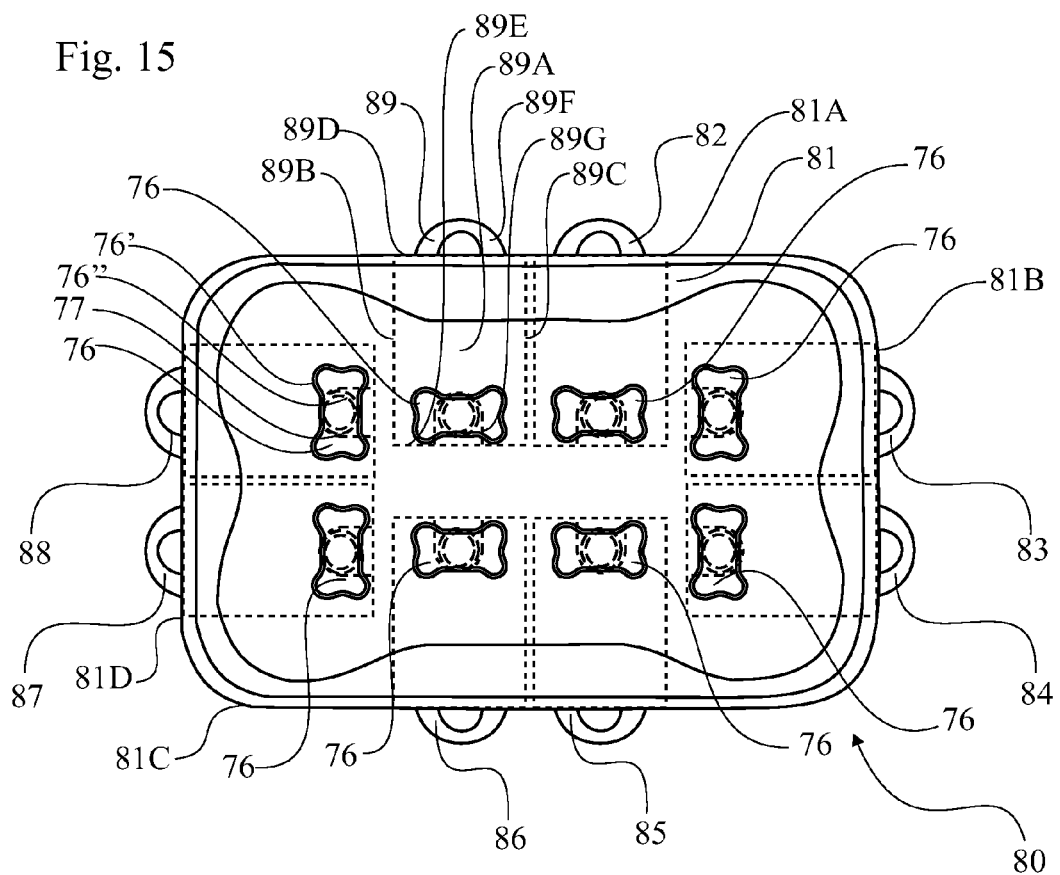
FIG. 15 shows a plastic game unit 20 (Dog Casino) according to the invention in a view from above.

FIG. 15 shows an eighth plastic game unit 80, according to the invention in a view from above. The said eighth game unit 80 consists of a plastic case 81, having in this example a substantially rectangular shape with two shorter sides 81B and 81D and two longer sides 81A and 81C. Assembled in the case 81 are eight identical plastic drawers 82-89 and eight identical plastic locking devices 76, preferably shaped/designed exactly as the locking devices described in relation to FIG. 13-14. It is evident that also this kind of multi functional locking device 76, may be made the subject for its own patent application, alone as such or in combination with one or more board games. The skilled person realises that the invention, and the number of pet game locks and pet game drawers may vary, e.g. to be more or less than eight. The eight plastic drawers 82-89 are fitting into corresponding openings in sides 81A, 81B, 81C and 81D, two openings and drawers at each side. The eight locking devices 76 are fitting into corresponding holes 77 in the case 81 and they go further into the locking units of the drawers 82-89, described below.

A drawer 89 consist of a bottom part 89A, a left and a right side 89B and 89C, and of a front and a back side 89D and 89E. To the outside of the front side 89D of the drawer 89 is a handle 89F attached. At the inside and centre of the back side 89E of the drawer 89 is built in a locking unit 89G having the same height as the back side 89E. The drawer 89, positioned in its closed situation in the long side 81A of the case 81, has only its handle 89F and its front side 89D visible on the outside of the case 81.

The drawer 89, positioned in its closed situation in the long side 81A, can be locked by assembling a locking device 76 and through putting its lock cylinder 76" through a hole 77 on the upper side of the case 81, and through the locking unit 89G of the drawer 89.

All the drawers 82-89 can be filled with one or more objects, and especially objects that interest and or attracts a pet. By example could a small snack for dogs be hidden in one of the closed drawers e.g. the drawer 89 and locked by the locking device 76 and the preparation of the drawer 89 is finished.

Figure 16:
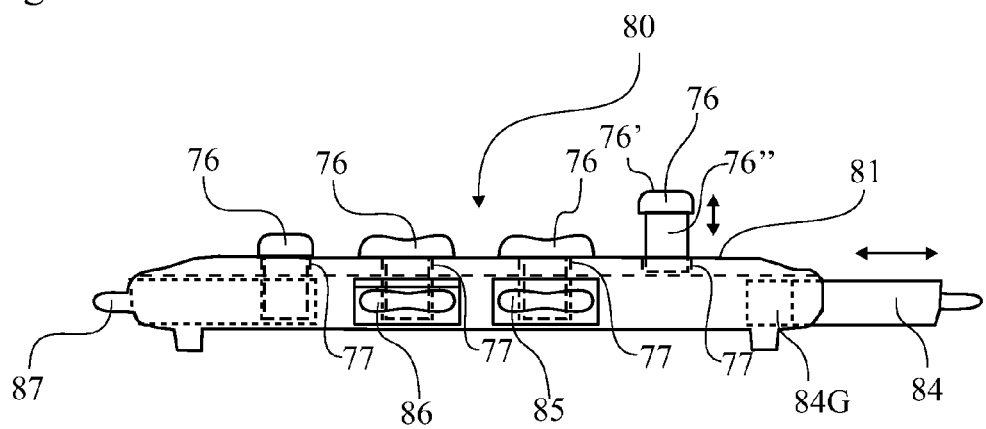
FIG. 16 shows a plastic game unit 20 according to the invention in a view from the front.

FIG. 16 shows the eighth plastic game unit 80 according to the invention in a view from the front. The drawer 84, positioned in its closed position in the side 81B, can be unlocked through lifting the locking device 76 and its lock cylinder 76", through the locking unit 84G of the drawer 84 and through a corresponding hole 77 in the upside of the case 81. The unlocked drawer 84 can now be pulled out of the case 81.

The method of, and how the function of the eighth plastic game unit 80 according to the invention is utilized when prepared for e.g. a training of a dog, will be explained in the following. Remove all the locks 76 by lifting them out of the case 81. Open all the drawers 82-89 by pulling them out of the case 81. Thereafter the drawers 82-89 can be filled with an object e.g. some kind of dog snack. When the dog snack is in place the drawers 82-89 shall pushed into their closed position. Finally the drawers 82-89 can be locked by assembling the locking devices 76, by putting them through the holes 77 in the case 81 and through the locking units 82G-89G of the drawers. The preparation of the eighth game unit 80 is finished. The dog will now start to sniff at and try to find out where the snack is located and further how to get it out. To succeed the dog has to find out how to lift out the locking devices 76 out of the case 81. After that the dog has to find out how to open the drawers 82-89 one by one. The dog will probably have to use its jaw or possibly its paws and claws to be able to solve the problem.

The invention described in FIG. 15-16 may, regarding at least some of its aspects, may be subject to a separate patent application. The features that may be focused in such a separate application are for instance, the use of the pet game locks that need to be lifted to release a drawer device, whereby the pet after finding the correct position first has to lift and remove the pet game lock thereafter has to pull the correct/corresponding drawer device to make the hidden object available.

It is an object of the present invention to provide a new pet-training board game that allows pet owners to assess their own training skills and to assess the effectiveness of the interaction they have with their family pet in a more challenging manner than most known games.

It is still another object of the present invention to provide a new pet-training board game that allows family members, friends or acquaintances to spend enjoyable time together while they assess their ability to interact with their pets, in a new manner.

The related art games and motivational tools, although useful for limited applications, do not achieve the benefits and advantages derived from the encouraging and motivating game of the invention shown in FIGS. 15, 16. The related art games do not provide for a method of assessing the pet training skills of a human and the interaction between a pet owner and his pet. Furthermore, the related art games and motivational tools do not provide for such a method in an entertaining and challenging game environment as this invention.

The invention is not limited to what is described above but may be varied within the scope of the appended claims, e.g. it is well understood by the skilled person that also other methods of manufacture may be used than thermo form moulding, e.g. cold pressing. Further it is also well understood that many different kind of polymeric materials may be used, depending on varying desires and/or needs, and that therefore the materials are not limited to conventional thermo forming polymeric materials, such as Poly Propylene-, Poly Ethylene- or rubber-compositions. Moreover it is evident that many other shapes, than a bone shape, may be used to fulfil the desire to have a smooth shape of the outer walls. For instance in some applications it may be desire able to have the cover and/or locking device in the shape of a letter or number having rounded edges.

The invention claimed is:

1. A pet board game including a game board comprising:
   a plurality of spaced apart tracks wherein, within each of said tracks there are two first cavities and a second cavity in between said first cavities said cavities extending below each of said tracks;
   two game covers being movably arranged along and engaging each of said tracks to facilitate covering each one of said cavities; and
   at least one pet board game detail having a body fitting into each of said tracks,
   wherein said body has a height, a width and a length arranged to be gripable by the mouth of a pet, said game covers comprising a body or body portion having outer walls comprising outer wall portions, a lower end and a top end, said body or body portion being arranged with an inwardly protruding void to form an open space within said body or body portion, wherein said void is formed by having a main portion of the total area exposed by said outer walls provided by wall portions having a limited wall thickness, and formed from a durable and washable polymeric material, and wherein said outer wall portions converge inwardly in a direction from said lower end towards the top end.

2. A pet board game detail according to claim 1, wherein said outer wall portions have a substantially equal wall thickness and are smoothly shaped.

3. A pet board game detail according to claim 2, wherein said outer wall portions have a substantially equal wall thickness of 0.5-5 mm.

4. A pet board game detail according to claim 2, wherein said outer wall portions have a substantially equal wall thickness of 1-3 mm.

5. A pet board game detail according to claim 1, wherein said body or body portion is produced with a pet related shape.

6. A pet board game detail according to claim 1, wherein said pet related shape is a bone for a dog.

7. A pet board game detail according to claim 1, having a standardized shape which allows a use and exchange of the said pet board game detail between different game units.

* * * * *